Dec. 26, 1944. T. R. WINGATE 2,366,080
VALVE MEANS FOR DOUBLE-ACTING PUMPS
Filed July 9, 1943
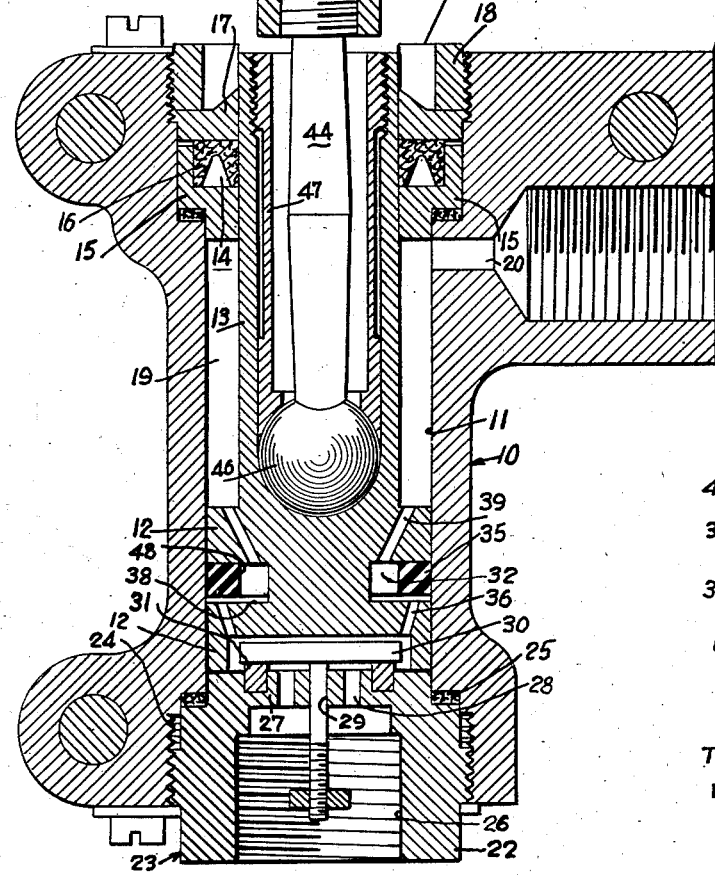
INVENTOR
THOMAS R. WINGATE
BY
Toulmin & Toulmin
ATTORNEYS Patented Dec. 26, 1944

2,366,080

UNITED STATES PATENT OFFICE 2,366,080

VALVE MEANS FOR DOUBLE-ACTING PUMPS

Thomas R. Wingate, Montreal, Quebec, Canada, assignor to Dowty Equipment (Canada) Limited, Montreal, Quebec, Canada, a company Application July 9, 1943, Serial No. 493,960

6 Claims. (Cl. 103—178)

This invention relates to a hand pump, and particularly to hand pumps of the double-acting type.

An object of the invention is to provide a hand pump with a resilient valve means that may also act as a sealing gland for the piston of the hand pump.

An object of the invention is to provide a double-acting hand pump for producing a substantially continuous flow of fluid that is provided with a resilient valve means that operates as a check valve upon one stroke of movement of the pump as well as a sealing gland member.

A still further object of the invention is to provide a piston type of double-acting fluid pump that is constructed and arranged to discharge fluid under pressure in both directions of movement of the pistons of the pump wherein a resilient valve member is provided in the piston that acts as a check valve in one direction of movement of the piston, and also acts to prevent any substantial leakage of fluid past the piston when it is operated.

Further objects and advantages will become apparent from the drawing and the following description.

In the drawing:

Figure 1 is a vertical cross-sectional view of a fluid pump incorporating features of this invention.

Figure 2 is an enlarged cross-sectional view of a portion of the fluid pump showing the resilient valve member therein as disposed during the downstroke of the piston.

Figure 3 is an enlarged cross-sectional view of a portion of the pump showing the resilient valve as disposed during the upstroke of the piston.

In this invention the fluid pump is of the double-acting type and consists of a cylinder body 10 that has a cylinder bore 11. A piston 12 is slidably positioned in the cylinder bore 11 and has a reduced diameter plunger portion 13 that extends from one side of the piston 12, the piston 12 thereby being carried upon the end of the plunger 13.

The plunger 13 extends through a sealing gland 14 provided between the plunger 13 and the cylinder 10 in one end thereof which consists of a gland member 15 that receives a packing ring 16 held in position by means of a gland 17 and a threaded ring 18. The sealing gland 14 thereby prevents leakage of fluid from the cylinder 10 within the space 19 provided between the reduced diameter plunger 13 and the cylinder bore 11. A discharge passage 20 is provided in one end of the cylinder 10 for discharge of fluid under pressure and communicates with a threaded opening 21 adapted to receive a conduit or pipe for conducting fluid under pressure to any suitable service. The lower end of the cylinder 10 receives a check or foot valve member 22 that consists of an externally threaded body 23 that is threaded into the threaded opening 24 in the cylinder 10 and sealed against a packing member 25. The body member 23 has an internally threaded opening 26 adapted to be connected to a conduit for supplying fluid to the cylinder 10. The end wall 27 of the body 23 is provided with a plurality of passages 28 through which fluid passes into the cylinder bore 11. The body 23 is also provided with an axial opening 29 that receives a poppet type valve 30 that is adapted to seat upon a seat member 31 carried in the body 23.

The piston 12 is provided with an annular recess 32 that receives a resilient valve ring 35. There is an annular clearance between the inside diameter of the valve ring 35 and the bottom diameter of the recess 32. The axial thickness of the valve ring 35 is less than the axial width of the recess 32. The outside diameter of the resilient rubber-like ring 35 is such that it provides a slight interference, or friction, with the cylinder bore 11. In fact, the outside diameter of the ring 35 is approximately .885 inch while the diameter of the cylinder bore is approximately .875 inch, as by way of example. The valve ring 35 is made from a rubber or rubber-like material so that it is resilient and can conform to the shape of any surface that it engages. A plurality of passages 36 extend from the lower face of the piston 12 into communication with the annular recess 32, the upper end of the passages 36 being disposed beneath the lower face 37 of the valve ring 35, so that when the valve ring 35 engages the lower face 38 of the recess 32, the passages 36 will be closed.

A plurality of passages 39 extend from the annular recess 32 into communication with the space 19 between the plunger 13 and the cylinder bore 11, these passages being in free and open communication therebetween at all times.

The rubber or rubber-like valve ring 35 may be constructed from one of the synthetic rubber-like materials, many of which are commercially available today, so that the ring 35 will have resiliency on its various surfaces as well as a certain amount of stretchability to it. The piston 12 may be machined in the usual manner with the normal clearances that are provided between a piston and a cylinder of the pump of this type.

The piston 12 and the plunger 13 are operated by means of a handle 40 that is disposed between a pair of co-operating ears 41 disposed on opposite sides of the handle 40, a pivot pin 42 extending therethrough for attaching the handle 40 to the ears 41. The handle 40 is in the form of a bell crank lever, and the end 43 thereof is connected to the plunger 13 by means of a piston rod 44 that is connected to the end 43 of the handle 40 by means of a pivot pin 45 and to the plunger 13 by means of a ball member 46 retained within the plunger 13 by means of a sleeve member 47 that is threaded into the upper end of the plunger 13, whereby movement of the handle 40 about the pivot 42 will produce reciprocation of the piston 12.

The fluid pump has previously been referred to as the double-acting type of pump because it will discharge fluid under pressure through the discharge passage 20 on either stroke of operation of the piston 12. To this end, the area enclosed by the outside diameter of the plunger portion 13 of the piston is approximately one-half that enclosed by the diameter of the cylinder bore 11. The volume swept by the plunger portion 13 in passing thru the packing ring 16 during any axial travel is therefore approximately one-half of the volume swept by the piston 12, including its valve ring 35, in the same axial travel. Assuming the space 19 to have previously been filled with fluid, when the piston 12 moves on an upstroke, from that position shown in Figure 1, the resilient valve ring 35 will be seated upon the bottom wall 38 of the recess 32 in the piston 12 whereby to close the passages 36. This upward movement of the piston 12 will therefore force fluid from the space 19 through the discharge passage 20, and the reduced pressure above the poppet valve 30, caused by movement of the piston 12 upwardly, will open the poppet valve 30 and permit fluid to enter the chamber beneath the piston 12 through the passages 28. Upon a downstroke of the piston 12 the resilient ring 35 will be positioned against the top wall 47 of the recess 32, as illustrated in Figure 2, so that fluid entrapped within the chamber beneath the piston 12, due to closure of the poppet valve 30, will move upwardly through the passages 36, the annular recess 32 and the passages 39 into the space 19. However, since for any volume of fluid passing from the lower to the upper side of the piston 12 in the above manner, approximately one-half that volume of plunger 13 passes inwards through the packing ring 16, one-half of the volume of fluid will be discharged under pressure through the discharge passage 20. It will thus be seen that the fluid pump provides a substantially continuous discharge of fluid under pressure at a substantially constant rate of flow.

On the upstroke of the piston 12 the resilient annular valve ring 35 operates as a check valve to prevent return flow of fluid from the space 19 into the chamber beneath the piston 12. Since the valve ring 35 is made from a resilient rubber-like material it will be apparent that it will conform to the shape of any irregularities that may be present on the bottom wall of the recess and thereby provide a good and sufficient seal to prevent leakage of fluid under pressure into the passages 36. Also, since pressure is developed within the recess 32 by the upward movement of the piston 12, this pressure will be applied upon the top face of the resilient ring 35 to effectively seal the same against the bottom surface of the recess 32. Also, this pressure within the recess 32 may be utilized if desired to exert a certain amount of axial and radial compression of the valve ring 35 so that it will engage the cylinder wall 11 and effectively seal against the same to prevent leakage of fluid under pressure between the piston 12 and the cylinder bore 11, the pressure being applied upon the wall 48 of the ring 35 at this time, the seal being effective because of the low pressure that exists in the chamber beneath the piston 12 and the clearance space between the piston 12 and the cylinder wall 11 beneath the valve member 35. The valve ring, therefore, provides a check valve, which may also operate as a sealing gland member for the piston 12.

On the downstroke of the piston 12 the valve ring 35 will be disposed against the top wall 47 of the recess 32, as illustrated in Figure 2, so that there will be provided a free communication between the passages 36 and 39 to permit flow of fluid under pressure therethrough.

While the apparatus herein disclosed and described constitutes a preferred form of the invention, yet it is understood that the device is capable of mechanical alteration without departing from the spirit of the invention, and that all such modifications as fall within the scope of the appended claims are intended to be included herein.

Having thus fully described my invention what I claim as new and desire to secure by Letters Patent is:

1. A double-acting fluid pump including a cylinder, a piston reciprocable therein whereby to provide a space on one side thereof to receive fluid from a source of fluid, means forming a part of said piston extending therefrom from the side opposite to the aforesaid space whereby to enclose an area by the outside diameter of said extending means that is approximately one-half that enclosed by the inside diameter of the cylinder and thereby provide a space for receiving fluid from the first space, an annular ring-like recess in said piston, individual passage means extending from said recess into communication with said spaces on the opposite sides of said piston whereby said spaces are interconnected through said passage means and said recess, and a resilient ring valve member positioned within said recess in engagement with said cylinder and reciprocable in said recess upon reciprocation of said piston for closing the passage means connecting said recess with the first mentioned recess during reciprocation of said piston in one direction.

2. A double-acting fluid pump including a cylinder, a piston reciprocable therein whereby to provide a space on one side thereof to receive fluid from a source of fluid, means forming a part of said piston extending therefrom from the side opposite to the aforesaid space whereby to enclose an area by the outside diameter of said extending means that is approximately one-half that enclosed by the inside diameter of the cylinder and thereby provide a space for receiving fluid from the first space, an annular ring-like recess in said piston, individual passage means extending from said recess into communication with said spaces on the opposite sides of said piston whereby said spaces are interconnected through said passage means and said recess, and a resilient ring valve member positioned within said recess in engagement with said cylinder and reciprocable in said recess upon reciprocation of said piston for closing said passage means connecting said recess with said fluid receiving space during movement of said piston in one direction to produce fluid pressure within said second space and prevent fluid pressure developed within said second space from discharging into said first space and to open the aforesaid passage during movement of the piston in the opposite direction to permit the passage of fluid under pressure from the first space into the second space.

3. A double-acting fluid pump including a cylinder, a piston reciprocable therein whereby to provide a space on one side thereof to receive fluid from a source of fluid, means forming a part of said piston extending therefrom from the side opposite to the aforesaid space whereby to enclose an area by the outside diameter of said extending means that is approximately one-half that enclosed by the inside diameter of the cylinder and thereby provide a space for receiving fluid from the first space, an annular ring-like recess in said piston, individual passage means extending from said recess into communication with said spaces on the opposite sides of said piston whereby said spaces are interconnected through said passage means and said recess, and a resilient ring valve member positioned within said recess in engagement with said cylinder and reciprocable in said recess upon reciprocation of said piston for closing said passage means connecting said recess with said fluid receiving space during movement of said piston in one direction to produce fluid pressure within said second space and prevent fluid pressure developed within said second space from discharging into said first space and to open the aforesaid passage during movement of the piston in the opposite direction to permit the passage of fluid under pressure from the first space into the second space, said passages connecting said second space with said recess for continuously transmitting fluid pressure from said second space into said recess to continuously apply pressure upon said valve ring whereby to forcefully urge the same into sealing engagement with said cylinder and into closing engagement with said passages connecting said recess with said fluid receiving space.

4. A double-acting fluid pump including a cylinder, a piston reciprocable therein whereby to provide a space on one side thereof to receive fluid from a source of fluid, means forming a part of said piston extending therefrom from the side opposite to the aforesaid space whereby to enclose an area by the outside diameter of said extending means that is approximately one-half that enclosed by the inside diameter of the cylinder and thereby provide a space for receiving fluid from the first space, an annular ring-like recess in said piston, individual passage means extending from said recess into communication with said spaces on the opposite sides of said piston whereby said spaces are interconnected through said passage means and said recess, and a resilient ring valve member positioned within said recess in engagement with said cylinder and reciprocable in said recess upon reciprocation of said piston for closing said passage means connecting said recess with said fluid receiving space during movement of said piston in one direction to produce fluid pressure within said second space and prevent fluid pressure developed within said second space from discharging into said first space and to open the aforesaid passage during movement of the piston in the opposite direction to permit the passage of fluid under pressure from the first space into the second space, said passages connecting said second space with said recess for continuously transmitting fluid pressure from said second space into said recess to continuously apply pressure upon said valve ring whereby to forcefully urge the same into closing engagement with said passages connecting said recess with said fluid receiving space and continuously radially expand said ring into engagement with said cylinder whereby to seal the clearance space between said cylinder and said piston.

5. A double-acting fluid pump including a cylinder, a piston reciprocable therein whereby to provide a space on one side thereof to receive fluid from a source of fluid, means forming a part of said piston extending therefrom from the side opposite to the aforesaid space whereby to enclose an area between the outside diameter of said extending means and the inside diameter of the cylinder and thereby provide a space for receiving fluid from the first space, an annular ring-like recess in said piston, individual passage means extending from said recess into communication with said spaces on the opposite sides of said piston whereby said spaces are interconnected through said passage means and said recess, and a resilient ring valve member positioned within said recess in engagement with said cylinder and reciprocable in said recess upon reciprocation of said piston for closing the passage means connecting said recess with the first mentioned recess during the reciprocation of said piston in one direction.

6. A double-acting fluid pump including a cylinder, a piston reciprocable therein whereby to provide a space on one side thereof to receive fluid from a source of fluid, means forming a part of said piston extending therefrom from the side opposite to the aforesaid space whereby to enclose an area between the outside diameter of said extending means and the inside diameter of the cylinder and thereby provide a space for receiving fluid from the first space, an annular ring-like recess in said piston, individual passage means extending from said recess into communication with said spaces on the opposite sides of said piston whereby said spaces are interconnected through said passage means and said recess, and a resilient ring valve member positioned within said recess in engagement with said cylinder and reciprocable in said recess upon reciprocation of said piston for closing said passage means connecting said recess with said fluid receiving space during movement of said piston in one direction to produce fluid pressure within said second space and prevent fluid pressure developed within said second space from discharging into said first space and to open the aforesaid passage during movement of the piston in the opposite direction to permit the passage of fluid under pressure from the first space into the second space, said passages connecting said second space with said recess for continuously transmitting fluid pressure from said second space into said recess to continuously apply pressure upon said valve ring whereby to forcefully urge the same into closing engagement with said passages connecting said recess with said fluid receiving space and continuously radially expand said ring into engagement with said cylinder whereby to seal the clearance space between said cylinder and said piston.

THOMAS R. WINGATE.